United States Patent [19]

Kellner et al.

[11] Patent Number: 4,980,324

[45] Date of Patent: Dec. 25, 1990

[54] REGENERATION OR ACTIVATION OF NOBLE METAL CATALYSTS USING FLUOROHALOCARBONS OR FLUOROHALOHYDROCARBONS

[75] Inventors: Carl S. Kellner, Wilmington, Del.; Jan J. Lerou, Chadds Ford, Penn.; V.N.M. Rao; Klaus G. Wuttke, both of Wilmington, Del.

[73] Assignee: E. I. Du Pont de Nemours and Company, Wilmington, Del.

[21] Appl. No.: 412,326

[22] Filed: Sep. 25, 1989

[51] Int. Cl.$^5$ ............ B01J 38/46; B01J 27/13; C07C 19/08
[52] U.S. Cl. ............ 502/36; 502/181; 502/185; 502/230; 570/134; 570/176
[58] Field of Search ............ 502/36, 181, 230

[56] References Cited

U.S. PATENT DOCUMENTS

| | | |
|---|---|---|
| 2,942,036 | 6/1960 | Smith et al. ............ 570/176 |
| 3,418,256 | 12/1968 | Rigney et al. ............ 502/37 |
| 3,439,052 | 4/1969 | Bjornson ............ 570/176 |
| 4,164,481 | 8/1979 | Ma et al. ............ 252/414 |
| 4,319,060 | 3/1982 | Cunningham et al. ............ 570/134 |
| 4,873,381 | 10/1989 | Kellner et al. ............ 570/176 |

FOREIGN PATENT DOCUMENTS

| | | |
|---|---|---|
| 0316727 | 5/1989 | European Pat. Off. ............ 502/36 |
| 2009114 | 9/1971 | Fed. Rep. of Germany . |
| 54-87693 | 7/1979 | Japan . |
| 59-196742 | 11/1984 | Japan . |
| 62-282645 | 12/1987 | Japan . |

OTHER PUBLICATIONS

Franck et al., "Progress in Catalyst Deactivation", ed. by J. L. Figueiredo, Martinus Nijhoff, The Hague, 1982, p. 386ff.

*Primary Examiner*—Paul E. Konopka

[57] ABSTRACT

This invention provides a process for the regeneration and/or activation of a noble catalyst comprising contacting said catalyst with an atmosphere comprising a fluorohalocarbon and/or a fluorohydrocarbon of the formula, $C_nH_mF_pX_q$, wherein X is chlorine and/or bromine; n is an integer from 1 to 6; m is an integer from 0 to 6, provided that m can be no more than the total n in the compound; p and q are integers from 1–13 when the compound is acrylic and integers from 1–11 when the compound is cyclic, provided that the fluorohalocarbon and/or fluorohalohydrocarbon always contain at least one chlorine or bromine atom and provided that $m+p+q=2n+2$ when the compound is acrylic and that $m+p+q=2n$ when the compound is cyclic, at a temperature in excess of 200° C.

17 Claims, No Drawings

REGENERATION OR ACTIVATION OF NOBLE METAL CATALYSTS USING FLUOROHALOCARBONS OR FLUOROHALOHYDROCARBONS

BACKGROUND OF THE INVENTION

1. Field of the Invention

This invention relates to a process for the activation and/or regeneration of supported noble metal catalysts used for fluorohalocarbon or fluorohalohydrocarbon hydrodechlorination.

2. Background

Many factors are involved in the deactivation of a catalyst. Some causes of deactivation include: sintering, poisoning of active sites, physical deterioration such as crumbling, and coking. The exact cause of catalyst activity degeneration and its effects on a process depend on the nature of the process.

The regeneration of the activity of reforming catalysts has been studied for many years. Elaborate and costly procedures are typically required to restore catalyst activity. For example, J. P. Franck and G. Martino in "Progress in Catalyst Deactivation," ed. by J. L. Figueiredo, Martinus Nijhoff, The Hague, 1982, p. 386 ff, describe a normal regeneration procedure for reforming catalysts which involves four stages. The first stage usually involves cooling, the catalyst to some lower than operating temperature (about 200° C.), followed by removal of hydrocarbons and hydrogen by nitrogen. The second stage involves elimination of coke by combustion at 380° to about 500° C. During this stage it may be necessary to inject HCl, $CCl_4$, 1,2-dichloropropane or any other halogenated hydrocarbon which will produce HCl, during the combustion phase. The third stage involves restoration of catalyst acidity by increasing its chlorine content, in the form of HCl or a chlorinated compound such as $CCl_4$, to the desired level at about 500° C. in the presence of air. The last stage usually involves treating the catalyst with chlorine and oxygen at about 510°–530° C. in order to redisperse the platinum crystallites.

It is seen that there is a need for a simple and effective regeneration procedure.

Jap. Pat. Appln. 62-282645 (CA:109:54312r) discloses a process for the regeneration of supported palladium catalysts used for the hydrogenation of dienes by rinsing the used catalyst with aromatic hydrocarbons. The hydrocarbon treated catalysts were more effective than control catalysts treated with acetone.

Jap. Pat. Appln. 59-196742 (CA:102:68105t) discloses the regeneration of a palladium-containing catalyst, used for the purification of olefins by hydrogenation, by washing the spent catalyst with sulfur-free unsaturated or saturated hydrocarbons.

Jap. Pat. Appln. 54-87693 (CA:92:22019q) discloses the regeneration of various supported metal catalysts, including palladium, used for the purification of olefins by hydrogenation, by washing the spent catalyst with a $C_2$–$C_{12}$ olefin and/or paraffin, containing no aromatic hydrocarbon, at −30° to 170° C. and 0–100 kg/cm² gauge.

U.S. Pat. No. 4,164,481 discloses a process for the regeneration of Pd/C catalysts used for the hydrogenation of p-nitrophenol to p-aminophenol. The catalysts are regenerated by washing the deactivated catalysts with a polar organic solvent, e.g. acetic acid, contacting the washed catalyst with a hot aqueous alkali metal hydroxide solution, contacting the catalyst with an O-containing gas at moderately elevated temperatures, and washing the catalyst a final time with polar organic solvent.

Ger. Offen. DE 2,009,114 (CA:75:133480b) discloses a process for the regeneration of spent Pd catalysts from hydrogenation or hydrogenolysis processes. The deactivated catalysts are suspended in a solvent, e.g. $CHCl_3$ or $CH_2Cl_2$ and treated with chlorine, optionally together with nitrogen, followed by drying to obtain an active catalyst.

SUMMARY OF THE INVENTION

This invention provides a process for the regeneration and/or activation of a noble metal catalyst comprising contacting said catalyst with an atmosphere comprising a fluorohalocarbon and/or a fluorohalohydrocarbon of the formula, $C_nH_mF_pX_q$, wherein X is chlorine and/or bromine preferably Cl; n is an integer from 1 to 6; m is an integer from 0 to 6, provided that m can be no more than the total n in the compound; p and q are integers from 1–13 when the compound is acyclic and integers from 1–11 when the compound is cyclic, provided that the fluorohalocarbon and/or fluorohalohydrocarbon always contain at least one chlorine or bromine atom and provided that $m+p+q=2n+2$ when the compound is acyclic and that $m+p+q=2n$ when the compound is cyclic. The reaction is conducted in the substantial absence of hydrogen at a temperature in excess of 200° C.

Suprisingly, the practice of the present invention can regenerate the deactivated catalyst used in a hydrodehalogenation process to a level of activity substantially equivalent to that of freshly prepared catalyst. The catalyst whose performance has deteriorated in the presence of hydrogen and fluorocarbon or fluorohalohydrocarbon starting materials recovers its activity dramatically when treated with the starting material, in the substantial absence of hydrogen. Even more suprising, the practice of the present invention can activate poorly performing noble metal catalysts to a level of activity substantially equivalent to that of superior catalysts. In both of the above instances, activation or regeneration, the selectivity to the desired product is also substantially improved.

The practice of the present invention avoids the higher temperatures used in the regeneration of reforming catalysts and also avoids additional solvent treatment steps as well as treatment with air or oxygen.

The catalyst regeneration and/or activation used in the practice of this invention is useful to prolong the life of palladium hydrodechlorination catalysts employed in the conversion of chlorofluorocarbons to chlorofluorohydrocarbons or used for the conversion of chlorofluorohydrocarbons to more hydrogenated forms. This process is particularly useful for the conversion of 2,2-dichloro-1,1,1,2-tetrafluoroethane (CFC-114a) to 1,1,1,2-tetrafluoro-2-chloroethane (HCFC-124) and 1,1,1,2-tetrafluoroethane, (HFC-134a) and HCFC-124 to HFC-134a.

DETAILS OF THE INVENTION

The noble metal catalysts useful in the practice of this invention are ruthenium, rhodium, palladium, iridium and platinum. The noble metals may be combined in any proportions either supported or unsupported. The catalysts may be supported on carbon, alumina, fluorided alumina, aluminum fluoride, calcium fluoride, or other supports, with carbon being the most preferable. By fluorided alumina is meant a high fluorine content composition comprising aluminum, oxygen, and fluorine in such proportions that the total fluorine content of the catalyst composition taken as $AlF_3$ corresponds to preferably at least 50 weight percent, exclusive of any supported metal which is present A palladium on carbon support is especially preferred.

The method by which the catalyst is prepared is not critical to the regeneration and/or activation of the catalyst by the present method. Suitable methods of preparation are described in the art in U.S. Pat. Nos. 2,823,235; 3,265,636; and 3,271,327 as well as in many other references in the art. Many noble metal catalysts are also commercially available.

The fluorohalocarbons and/or fluorohalohydrocarbons useful in this invention are preferably those wherein halo is chloro or bromo. Included are halo- and halohydrocarbons composed of: carbon, chlorine, and-/or bromine and fluorine; and carbon, hydrogen, chlorine and/or bromine and fluorine. The fluorohalocarbons and/or fluorohalohydrocarbons may contain 1 to 6 carbon atoms, preferably 1 to 3 carbon atoms. The fluorohalocarbons and/or fluorhalohydrocarbons include cyclic as well as acyclic compounds represented by the empirical formula $C_nH_mF_pX_q$, where X is Cl and/or Br, preferably Cl, and n is an integer from 1 to 6; m is an integer from 0 to 6, provided that m can be no more than the total n in the compound; p and q are integers from 1-13 when the compound is acyclic and integers from 1-11 when the compound is cyclic, provided that the fluorohalocarbon and/or fluorohalohydrocarbon always contain at least one chlorine or bromine atom and provided that $m+p+q=2n+2$ when the compound is acyclic and that $m+p+q=2n$ when the compound is cyclic. The regeneration and/or activation temperature exceeds 200° C.

In a preferred embodiment the fluorohalocarbons and/or fluorohalohydrocarbons are represented by the above empirical formula where n=1 to 3, m is 0 to 4, p is 1 to 7, and q is 1 to 7.

The regeneration and/or activation temperature can range from about 200° C. to about 500° C. A preferred range is about 225° C. to about 350° C.

The catalyst to be regenerated and/or activated can be one used in a catalyzed reaction performed in either a batch or fixed-bed reactor. The regeneration procedure of this invention can be preceded by separating by conventional means, such as filtration or decantation, the deactivated catalyst particles from a solution utilized in the hydrogenation or other catalyzed reaction. It is convenient if the catalyst is one employed in a fixed bed, so that the deactivated catalyst can readily be separated from the solution utilized in the catalytic reaction by simply draining said solution from the catalytic reaction vessel. It is even more convenient if the catalyst is one employed in a fixed bed where the reaction such as hydrodechlorination is done in the vapor phase. Said vessel can then be conveniently employed as the vessel in which the deactivated catalyst is regenerated by the method of the present invention. In a like manner, the activation procedure of this invention can be carried out in a batch or fixed-bed reactor; but is more conveniently done in a fixed-bed reactor. The catalyst is contacted with a fluorohalocarbon or a fluorohalohydrocarbon, either under continuous flow or statically, in the substantial absence of hydrogen, for more than 15 minutes, preferably 3-8 hrs. Optimally hydrogen will be substantially absent during activation/regeneration. By substantial absence of hydrogen is meant that about 10% or less of hydrogen is present in the reaction mixture while still maintaining the advantages of this invention.

The fluorohalocarbons and fluorohalohydrocarbons utilized in the process of this invention are either commercially available or can be prepared by known methods.

Pressure is not critical. Subatmospheric, atmospheric or superatmospheric pressures may be used.

The process of this invention is carried out in a fluorohalocarbon and/or fluorohalohydrocarbon atmosphere, which may also contain inert gases such as, nitrogen, helium and argon.

EXAMPLES

Example 1

Hydrodechlorination Catalyt Regeneration

Reactions were performed in a fixed bed tubular reactor which was constructed of either Inconel TM Alloy 600 nickel alloy or Hastelloy TM Alloy C-276 nickel alloy. The reactor was heated by submersion in a fluidized sand bath with temperature control. The hydrogen feed rate was controlled with a mass flow controller. Chlorofluorocarbons and chlorofluorohydrocarbons were metered as liquids with liquid chromatography pumps, then combined with hydrogen and vaporized. The reactant ratios are expressed as molar ratios in the examples. The combined stream was then fed to the reactor. The reactor pressure was controlled with a back pressure regulator located in the reactor exit line.

Product analyses were done by gas chromatography; hydrogen was analyzed by a thermal conductivity detector and all other components by a flame ionization detector. The column was a 5% Krytox TM perfluorinated polyether on an inert support; temperature programmed from 70° C. to 190° C. at 10° C./min. Baseline separation of all components was obtained with this system.

A 0.5% Pd/4×8 mesh carbon catalyst that had been deactivated during a $CF_3CCl_2F$(CFC-114a) hydrodechlorination reaction was regenerated. The evaluation conditions were as follows: temperature was 125° C.; pressure was 50 psig; $H_2$ feed was 500 sccm; CFC-114a feed was 2.6 ml/min; and CFC-114a/$H_2$=1. The catalyst performance before regeneration was as follows: CFC-114a conversion=1%; $CF_3CH_2F$(HCFC-134a) selectivity=78%; $CF_3CHClF$(HCFC-124) selectivity=17%. The catalyst was regenerated by passing CFC-114a over the catalyst at 275° C. for 4 hr. After this regeneration treatment, the catalyst performance was as follows: CFC-114a conversion=3%; HCFC-134a selectivity=91%; HCFC-124 selectivity=4%.

Example 2

Hydrodechlorination Catalyst Regeneration

The general procedure was the same as described in Example 1. Another sample of the deactivated catalyst as described in Example 1 was evaluated under the following conditions: temperature was 79° C.; pressure was 50 psig; $H_2$ feed was 500 sccm; HCFC-124 feed was 2.2 ml/min; and HCFC-124/$H_2$=1. The catalyst performance before regeneration was as follows: HCFC-124 conversion=22%; $CF_3CH_2F$(HCFC-134a) selectivity=99%. The catalyst was regenerated by passing HCFC-124 over the catalyst at 280° C. for 14 hr. After this regeneration treatment, the catalyst performance was as follows: HCFC-124 conversion=44%; HCFC-134a selectivity =99%. Regeneration increased conversion of HCFC-124.

Example 3

Hydrodechlorination Catalyst Activation

The general procedure was the same as described in Example 1. A fresh sample of a 0.5% Pd/4×8 mesh carbon catalyst was activated. The evaluation conditions were as follows: temperature was 125° C.; pressure was 50 psig; $H_2$ feed was 500 sccm; CFC-114a feed was 2.6 ml/min; and CFC-114a/$H_2$=1. The catalyst performance before activation was as follows: CFC-114a conversion=3.3%; $CF_3CH_2F$(HCFC-134a) selectivity=82%; $CF_3CHClF$(HCFC-124) selectivity=13%. The catalyst was activated by passing CFC-114a over the catalyst at 275° C. for 4 hr. After this activation treatment, the catalyst performance was as follows; CFC-114a conversion=5%; HCFC-134a selectivity=90%; HCFC-124 selectivity=5%.

Comparative Example 1

Catalyst Regeneration Control Experiment

The general procedure was the same as described in Example 1. Another sample of the deactivated catalyst as described in Example 1 was evaluated under the following conditions: temperature was 140° C.; pressure was 50 psig; $H_2$ feed was 1000 sccm; CFC-114a feed was 5.2 ml/min; and CFC-114a/$H_2$=1. The fresh catalyst performance before regeneration was as follows: CFC-114a conversion=6%; $CF_3CH_2F$(HCFC-134a) selectivity=83%; $CF_3CHClF$(HCFC-124) selectivity=13%. The catalyst was treated by passing HCl over the catalyst at 275° C. for 12 hr. After this potential regeneration treatment, the catalyst performance was as follows: CFC-114a conversion=2%; HCFC-134a selectivity =85%; HCFC-124 selectivity=6%. The catalyst was then treated by passing $CCl_4$ over the catalyst at 280° C. for 6 hr. After this potential regeneration treatment, the catalyst performance was as follows: CFC-114a conversion=3%; HCFC-134a selectivity =70%; HCFC-124 selectivity=20%.

These experiments demonstrate the superiority of CFC-114a and HCFC-124a over HCl and $CCl_4$ for catalyst regeneration.

Example 4

Hydrodechlorination Catalyst Activation

General Procedure for Catalyst Reduction

A 6"×½" O. D. Hastelloy TM C nickel alloy reactor was charged with the catalyst for evaluation. The reactor contents were heated to a temperature of 175° C. over a period of five hours, during which time an equimolar flow, 10 ml/min each, of nitrogen and hydrogen was passed through the reactor. At the end of this five hour period, nitrogen flow was stopped, the hydrogen flow increased to 20 ml/min, the reactor temperature raised to 275° C. over a 2½ hour period and maintained at this temperature for an additional 16 hours. After this period, the reactor temperature was decreased to the desired operating temperature for catalyst evaluation.

General Procedure for Catalyst Pretreatment with Chlorofluorocarbon or Chlorofluorohydrocarbon The chlorofluorocarbon or chlorofluorohydrocarbon as a vapor was passed through the reactor containing fresh or used catalyst at room temperature. The temperature was gradually increased to 300° C. over a 12 hour period and maintained at this temperature for about 8 hours. The temperature was then reduced to the desired operating range prior to catalyst evaluation.

General Procedure for Product Analysis

The products leaving the reactor were analyzed on line using a gas chromatograph. The column consisted of a 20'×⅛" s/s tube containing Krytox TM perfluorinated polyether on an inert support. Helium was used as the carrier gas. The product analyses are reported in area %.

To the reactor was charged a commercial 1% palladium catalyst on 4 mm carbon extrudates (4.5 g). It was then reduced according to the general procedure for reduction described above. To the reactor maintained at 150° C. was fed 20 ml/min of hydrogen and 10 ml/min of CFC-114a. After about 16 hours of steady state operation, CFC-114a conversion was 14.4% and selectivity to $CF_3CH_3$ (HFC-143a) was 13.5%, to HCFC-124 was 17.6% and to HFC-134a was 68.9%.

To the reactor maintained at 250° C. was fed 10 ml/min of hydrogen and 10 ml/min of HCFC-124. Again after about 16 hours of steady state operation, the product leaving the reactor was analyzed with the following results. HCFC-124 conversion was 7.8% and selectivity to HFC-143a was 29.2% and to HFC-134a was 70.8%.

Performance of Chlorofluorocarbon Activated Catalyst

The above catalyst was cooled to room temperature and was pretreated with CFC-114a according to the General Procedure for Pretreatment To the pretreated catalyst maintained at 150° C. was fed 10 ml/min CFC-114a and 20 ml/min hydrogen. After about 16 hours of steady state operation, product analysis showed that CFC-114a conversion was 15.9% and selectivity to HFC-143a was 6.1%, to HCFC-124, 11.5% and to HFC-134a, 82.4%. To the catalyst activated as above and maintained at 250° C. was feed 10 ml/min HCFC-124 and 10 ml/min hydrogen. After about 16 hours of steady state operation, product analysis showed that HCFC-124 conversion was 11.6% and selectivity to HFC-143a was 7.9% and to HFC-134a, 92.1%.

Example 5

Hydrodechlorination Catalyst Activation

The reactor was charged with 5.0 g of a commercial 0.5% palladium on 4×8 mesh carbon granules. It was reduced according to the General Procedure (Ex. 4) and its performance evaluated for hydrodehalogenation of CFC-114a and HCFC-124. After the completion of this evaluation, the catalyst was pretreated with CFC-114a according to the General Pretreatment Procedure (Ex. 4) and its performance evaluated again for hydrodehalogenation of CFC-114a and HCFC-124. The feed data and results are summarized in Table 1.

TABLE 1

| H₂ mL/min | Feed Type | Feed mL/min | T °C. | % Conv. | % Selectivity to 143a | 124 | 134a |
|---|---|---|---|---|---|---|---|
| Before Pretreatment | | | | | | | |
| 20 | 114a | 10 | 150 | 38.5 | 6.2 | 19.4 | 74.3 |
| 10 | 124 | 10 | 250 | 38.8 | 6.7 | | 93.3 |
| After Pretreatment | | | | | | | |
| 20 | 114a | 10 | 150 | 37.5 | 7.2 | 12.0 | 80.8 |
| 10 | 124 | 10 | 250 | 39.8 | 2.2 | | 97.8 |

After pretreatment, the catalyst selectivity to HFC-134a increases when employing either CFC-114a or HCFC-124 as feeds.

Example 6

Hydrodechlorination Catalyst Activation

Example 5 was substantially repeated with 5.0 g of a different commercial 0.5% palladium on 4×8 mesh carbon granules which was deactivated in use prior to charging into the reactor, except that the pretreatment was done at 50 psig instead of atmospheric pressure. Feed ratios and results obtained on this catalyst before and after pretreatment are shown in Table 2.

TABLE 2

| H₂ mL/min | Feed Type | Feed mL/min | T °C. | % Conv. | % Selectivity to 143a | 124 | 134a |
|---|---|---|---|---|---|---|---|
| Before Pretreatment | | | | | | | |
| 20 | 114a | 10 | 150 | 11.0 | 2.2 | 17.6 | 80.2 |
| 10 | 124 | 10 | 250 | 7.0 | 3.0 | | 97.0 |
| After Pretreatment | | | | | | | |
| 20 | 114a | 10 | 150 | 20.3 | 1.8 | 5.7 | 92.5 |
| 10 | 124 | 10 | 250 | 22.9 | 0.3 | | 99.7 |

It is observed that the pretreatment improves both the conversion and HFC-134 selectivity from either CFC-114a or HCFC-124.

Example 7

Hydrodechlorination Catalyst Activation

Example 5 was substantially repeated with 5.0 g of a commercial 1% palladium on 2.5×4.5 mm carbon granules Feed ratios and results obtained with this catalyst before and after pretreatment are shown in Table 3.

TABLE 3

| H₂ mL/min | Feed Type | Feed mL/min | T °C. | % Conv. | % Selectivity to 143a | 124 | 134a |
|---|---|---|---|---|---|---|---|
| Before Pretreatment | | | | | | | |
| 20 | 114a | 10 | 150 | 9.9 | 31.9 | 11.3 | 50.0 |
| 10 | 124 | 10 | 250 | 14.8 | 1.4 | | 98.6 |
| After Pretreatment | | | | | | | |
| 20 | 114a | 10 | 150 | 32.6 | 14.0 | 4.5 | 81.4 |
| 10 | 124 | 10 | 250 | 29.5 | 0.4 | | 99.6 |

This example shows that conversion and selectivity to HFC-134a can be significantly improved from either CFC-114a or HCFC-124 by pretreatment.

Example 8

Hydrodechlorination Catalyst Activation

Example 5 was substantially repeated with 5.0 g of a commercial 0.2% palladium on 4×8 mesh carbon granules. Feed ratios and results obtained with this catalyst before and after pretreatment are shown in Table 4.

TABLE 4

| H₂ mL/min | Feed Type | Feed mL/min | T °C. | % Conv. | % Selectivity to 143a | 124 | 134a |
|---|---|---|---|---|---|---|---|
| Before Pretreatment | | | | | | | |
| 20 | 114a | 10 | 150 | 16.8 | 20.5 | 10.3 | 68.6 |
| 10 | 124 | 10 | 250 | 9.4 | 3.3 | | 96.7 |
| After Pretreatment | | | | | | | |
| 20 | 114a | 10 | 150 | 8.9 | 19.2 | 3.9 | 76.9 |
| 10 | 124 | 10 | 250 | 15.1 | 0.6 | | 99.4 |

While, on this catalyst, conversion did not improve for CFC-114a hydrodehalogenation after pretreatment, selectivity to HFC-134a did increase. Both conversion and selectivity improved for the hydrodehalogenation of HCFC-124.

As many differing embodiments of this invention may be made without departing from the spirit and scope thereof, it is to be understood that this invention is not limited to the specific embodiments described except as defined by the appended claims.

We claim:

1. A process for the regeneration of a supported or unsupported noble metal catalyst, used as a catalyst for fluorohalocarbon hydrodechlorination or fluorohalohydrocarbon hydrodechlorination, comprising contacting said catalyst at a temperature in excess of 200° C. with an atmosphere containing a fluorohalocarbon or a fluorohalohydrocarbon of the formula $C_nH_mF_pX_q$, wherein X is chlorine and/or bromine; n is an integer from 1 to 6; m is an integer from 0 to 6, provided that m can be no more then the total n in the compound; p and q are integers from 1–13 when the compound is acyclic and integers from 1–11 when the compound is cyclic, provided that the fluorohalocarbon and/or fluorohalohydrocarbon always contain at least one chlorine or bromine atom and provided that $m+p+q=2n+2$ when the compound is acyclic and that $m+p+q=2n$ when the compound is cyclic, in the substantial absence of hydrogen, and in the absence of air and/or oxygen for a period in excess of 15 minutes.

2. Process of claim 1 wherein the temperature range is 225° C. to 350° C.

3. Process of claim 2 where the said contacting of the catalyst with said fluorohalocarbon or fluorohalohydrocarbon is for a three to four hour period.

4. The process of claim 1 wherein the noble metal catalysts used are selected from ruthenium, rhodium, palladium, iridium and platinum and/or a combination thereof.

5. The process of claim 4 wherein the noble metal catalysts are unsupported.

6. The process of claim 4 wherein the noble metal catalysts are supported.

7. The process of claim 6 wherein the noble metal catalysts are supported on supports selected from carbon, alumina, fluorided alumina, aluminum fluoride and calcium fluoride.

8. The process of claim 7 wherein the catalysts are supported on carbon supports.

9. The process of claim 4 wherein the noble metal is palladium.

10. The process of claim 1 wherein fluorochlorocarbons are used in the contacting process.

11. The process of claim 1 wherein fluorochlorobromocarbons are used in the contacting process.

12. Process of claim 10 wherein the number of carbon atoms in the fluorochlorocarbon, n, is 1 to 3.

13. The process of claim 1 wherein gases selected from nitrogen, helium and argon and/or mixtures thereof are present.

14. The process of claim 1 carried out in a batch reactor.

15. The process of claim 1 carried out in a fixed-bed reactor.

16. The process of claim 1 wherein the fluorohalocarbon or fluorohalohydrocarbon represented by the formula $C_nH_mF_pX_q$ has n of 1 to 3, m of 0 to 4, p of 1 to 7 and q of 1 to 7.

17. The process of claim 1 wherein fluorobromocarbons are used in the contacting process.

* * * * *